United States Patent
Nene (10) Patent No.: US 10,725,747 B1
(45) Date of Patent: Jul. 28, 2020

(54) DYNAMICALLY CUSTOMIZABLE PORTAL

(71) Applicant: AMAZON TECHNOLOGIES, INC., Seattle, WA (US)

(72) Inventor: Bhushan Sharad Nene, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 391 days.

(21) Appl. No.: 15/268,820

(22) Filed: Sep. 19, 2016

(51) Int. Cl.
*G06F 8/35* (2018.01)
*G06F 16/958* (2019.01)

(52) U.S. Cl.
CPC .............. *G06F 8/35* (2013.01); *G06F 16/986* (2019.01)

(58) Field of Classification Search
CPC .............. G06F 3/0631; G06F 8/34–355; G06F 9/50–5094; G06F 8/00–78
See application file for complete search history.

(56) References Cited

U.S. PATENT DOCUMENTS

| | | | | |
|---|---|---|---|---|
| 2007/0101321 A1* | 5/2007 | Mahoney | ........... | G06F 8/34 717/168 |
| 2008/0270977 A1* | 10/2008 | Nucci | ........... | G06F 8/10 717/105 |
| 2010/0131869 A1* | 5/2010 | Adachi | ........... | G06F 8/00 715/760 |
| 2012/0144285 A1* | 6/2012 | Bach | ........... | G06F 17/243 715/221 |
| 2014/0068551 A1* | 3/2014 | Balasubramanian | ..... | G06F 8/35 717/107 |
| 2015/0067171 A1* | 3/2015 | Yum | ........... | G06F 9/5072 709/226 |

(Continued)

OTHER PUBLICATIONS

Barla, Michal, Michal Tvarožek, and Mária Bieliková. "Rule-based user characteristics acquisition from logs with semantics for personalized web-based systems." Computing and Informatics 28.4 (2012): 399-427. (Year: 2012).*

(Continued)

*Primary Examiner* — Geoffrey R St Leger
*Assistant Examiner* — Joanne G Macasiano
(74) *Attorney, Agent, or Firm* — Blank Rome LLP (57) ABSTRACT

In a provider network, a developer console generates web pages defining a developer portal for transmission to web browsers. An application architecture modeling service analyzes developer interactions with services executing on the provider network to allow the developer to create an application. From the developer interactions (e.g., API calls, click stream data), the application architecture modeling service dynamically determines a model of the architecture of the application and updates the model as the developer continues to further interact with the developer services. The web pages generated by the developer console are encoded to contain graphical images of the application's model including hyperlinks. When displayed on the developer's browser, a graphical depiction of the application's architecture is rendered and hyperlinks associated with the individual resources shown in the graphical depiction can be accessed to allow the developer quick access to development tools specific to each such resource.

19 Claims, 5 Drawing Sheets

(56) References Cited

U.S. PATENT DOCUMENTS

2015/0082181 A1* 3/2015 Ames .................. G06F 3/04815
                                                                       715/738
2017/0085445 A1* 3/2017 Layman ................ H04L 43/045
2017/0242781 A1* 8/2017 Atzitz ....................... G06F 8/70
2018/0060326 A1* 3/2018 Kuo ....................... G06Q 50/01

OTHER PUBLICATIONS

Goldbach, Tobias, Viktoria Kemper, and Alexander Benlian. "Mobile application quality and platform stickiness under formal vs. self-control—Evidence from an experimental study." (2014). (Year: 2014).*

* cited by examiner

DYNAMICALLY CUSTOMIZABLE PORTAL

BACKGROUND

Public cloud service providers offer hardware and software systems within their provider networks for use by their customers. Customers can request resources within the provider network to be created and launched for the customers. Examples of resources may include storage resources, processing resources, streaming resources, etc. Many customers use the provider network to host applications created by the customer, and the service provider may offer numerous application development tools which are usable by developers to create the applications that execute on the provider's network. A developer (a person that creates an application) may access the development tools through a developer's portal which may be a graphical user interface rendered in, for example, a browser on the developer's workstation to create the various resources for a given application, edit the resources of the application, test the application, etc.

The development tools may include numerous services that can be used by developers to create any of variety of resources. For example, a table creation tool may allow the developer to create a particular table, give it a name, and specify its structure (e.g., the type of data it is to contain and how the data is structured in the table). A developer may create numerous tables for a given application and may create other resources as well, such as software environments in which customized code is executed when needed as triggered by a developer-specified event. Data to be stored in the tables may be from a data stream and another development tool may permit the developer to create the data streams and specify the type and an amount of data to be included in the stream. Some service providers may offer numerous development tools for use by the developers and such tools may be accessible through nested drop-down menus or other navigable user interface mechanisms provided in the developer portal.

BRIEF DESCRIPTION OF THE DRAWINGS

For a detailed description of various examples, reference will now be made to the accompanying drawings in which.

DETAILED DESCRIPTION

As noted above, the portal that a developer can use to create and manage an application hosted on a provider network may have numerous tools at his disposal. The various tools may be selected from a menu elements displayed by a browser executing on the developer's workstation. The tools correspond to services that the service provider offers for use by the developer to implement whatever resources the developer chooses for the application. When selected, any given menu element may generate another set of menu choices and each of those menu choices may lead to yet another one or more menu choices or other forms of user selection. If, for example, the developer wants to edit a particular table previously created, he may have to navigate through the user interface to access a "table creation" service (or equivalent). Then, the developer may be forced to navigate through the other options to select the particular table resource to be edited before the developer is able to actually make the edit to the targeted table resource. Multiple "clicks" or other forms of user interface selection may be required to select the particular resource to be accessed. As the developer moves back and forth between the various resource components comprising his application, the aforementioned navigation through the portal interface can be unproductively time-consuming.

The embodiments described herein are directed to a modeling service that dynamically determines the architecture being created by a developer for an application and customizes a developer portal based on the dynamically determined architecture. The modeling service may analyze interactions between the developer and application development tools offered by the service provider. The application development tools include various services that the developer can use to create his application. The services may include storage services, services that permit a customer to provide his own custom code, streaming services, database services, etc. The developer may interact with the application development tools in a variety of ways such as through a developer portal generated by a service within the service provider's network and displayed by a browser executing on the developer's own computing device. Alternatively or additionally, the developer may generate and submit requests (also referred to as "calls") to application programming interfaces (APIs) through, for example, a command line interface or a script file.

The modeling service analyzes the developer's accesses to the application development tools to determine a model of the architecture of an application that the developer is in the midst of creating. The developer need not explicitly specify the architecture of the application and, instead, the modeling service determines the architecture from an analysis of how the user interacts with the set of available tools to create the application. Other sources of resource-related data can be used as well to compute a confidence level as to the architecture determined based on the analysis of the developer-tool interactions. Such other data sources may include network traffic, if any, between the resources initially determined to be part of the developer's application, alphanumeric tags that may have been assigned to the resources, resource access policies, application architecture definition data, etc.

The modeling service may dynamically update (e.g., change) the model of the application's architecture as the developer continues to further interact with the development tools. As the modeling service generates and updates the model, the modeling service stores a description of the model in a storage device. A developer console then may access the updated model from the storage and generate one or more web pages containing a graphical image depiction of the model as determined by the modeling service for display in a browser executing on the developer's computing device. The graphical image may include a visual representation such as an icon of each resource determined to be included in the model. A hyperlink may be associated with each icon, and each hyperlink may include a reference to a file or other data structure that includes selectable operations associated with the resource such as operations that can be performed on the resource (e.g., edit, save, delete, upload, etc.). When the hyperlink of a given resource icon is activated by the developer, one or more actions may be displayed in the developer's browser that are selectable by the developer. The developer thus need not navigate through a series of menu options (or equivalent) to select the particular resource to be accessed as icons of the resources determined to be in the developer's application are already displayed on the developer's computing device. Working on the development of a multi-resource application is faster and easier for the developer.

Figure 1:
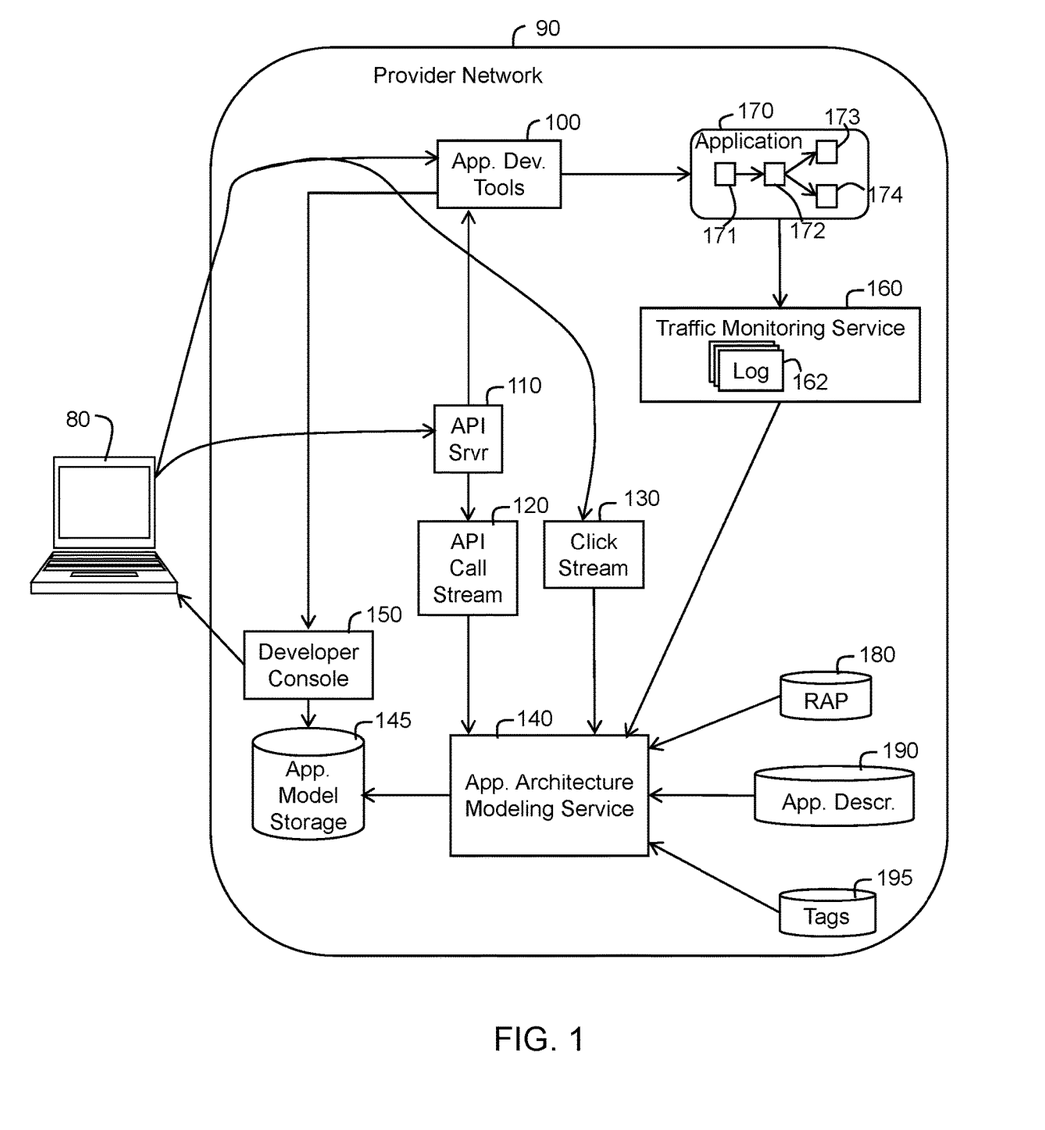
FIG. 1 shows a system for dynamically customizing a developer portal in accordance with various examples.

FIG. 1 illustrates an example of a provider network 90 which is accessible by, for example, customers of a service provider. The customers can access services within the provider network 90 to create virtual machines hosted on server computers within the provider network and use the virtual machines to perform tasks and jobs that are customer-specific. For example, some customers may want to have their websites hosted on the provider network and request the launch of virtual machines to function as web servers and back-end application servers. Other customers might use the provider network to perform batch job processing on large sets of data.

The provider network 90 includes application development tools 100, an API sever 110, an API call stream 120, a click stream 130, an application architecture modeling service 140, application model storage 145, a developer console 150, and a traffic monitoring service 160. Each of the aforementioned components may be implemented as computing devices executing software containing machine instructions configured to perform the various functions attributed to each such component.

The application development tools 100 comprise one or more services that are usable by a developer to create an application that can be hosted by and executed on the provider network 90. In one example, a service accessible through the application development tools 100 is a service that permits a developer to upload his own executable code to the provider network and have it executed on a triggering event also specified by the developer. When the triggering event occurs, a container (e.g., a Linux style container) can be created on a host computer within the provider network, or in a virtual machine executing on a host computer, and the developer's code executes within the container. When the code completes its task, the container can be terminated. As such, the customer need not pre-allocate, and thus pay for, a virtual machine to be continuously available to execute code periodically. The customer only pays for the actual execution time of the code. Another service may be a streaming service in which data such as data collected or otherwise obtained over time can be stored pending further processing. In another example, a service may permit a developer to customize his own APIs and instantiate an API gateway to process any incoming API requests. Data base services also can be included in the application development tools 100 to permit the developer to create and format databases. Numerous other types of services may be provided as well to the developer by way of application development tools 100.

The various services that the developer uses to create his application (e.g., application 170) can access one another. For example, an API gateway can be created by the developer to forward custom-defined API requests as input to developer-created code that processes the API requests. In one example, the API requests may contain or refer to sensor data and the developer-defined code may store the sensor data in a stream resource. Another developer-defined code may be instantiated to perform processing on the sensor data from the stream resource and save the processed sensor data to a storage service.

The developer may use his computing device 80 to interact with the application development tools 100 in at least two different ways. The developer may access a developer portal generated and transmitted by the developer console 150 to a web browser executing on the computing device. The developer portal may include multiple developer tools selection elements such as soft buttons, drop-down menus, text input fields, etc. to select the services to be included in the application. Additionally or alternatively, the developer may submit API requests to the API server 110 for use of the various services within the application development tools 100. For example, an API request may be to create a database to contain specified data of specified formats, to view the developer's custom code, etc.

The interactions between the developer, via computing device 80, and the application development tools 100 may be captured in the API call stream 120 and the click stream 130. The API server 110 may forward a copy of each API request to the API call stream 120. The web browser on the developer's computing device 80 may generate a formatted data set, which may be stored in the click stream 130. In one embodiment, JavaScript executing within the browser on the computing device 80 may generate the data set in a JavaScript Object Notation (JSON) document, and the JSON document may be stored in the click stream 130. The API call stream 120 and the click stream 130 may be implemented as storage buffers such as first in-first out buffers.

By way of an example, through his or her browser, if the developer clicks on (or performs an equivalent operation) a button to upload some custom code to the service that permits the customer to upload and run such code, the JSON document may specify the name of the service, the name of the resource within the service and the action requested by the developer. The following is an example:

{
service: "Service XYZ"
resource: "FunctionX"
action: "Deploy"
url: "https://console.company.com/_________"
timestamp: 1469137397
} where Service XYX is the name of the service that permits the customer to upload and run his own code, Function X is the name of the code assigned by the developer, the action specifies the type of action desired by the developer, the Uniform Resource Locator (URL) is the identifier of the website of the developer console, and the time stamp is assigned by the developer's web browser upon selection of the upload button. In some embodiments, the resource name may be an alphanumeric name assigned by the developer, while in other embodiments, the resource is one of multiple pre-configured resources within the service that the developer can choose. The action is the type of operation that the developer chooses to perform on the specified resources and is specific to the type of service and resource specified. In the example above, the developer is attempting to upload some code to the FunctionX resource of Service XYZ. Other examples of actions can be edit, delete, view, create, etc. The API requests received by the API server 110 can be configured to contain the same information as that contained in the JSON documents generated through interaction with the developer console.

The application architecture modeling service 140 retrieves the API requests from the API call stream 120 and/or the click stream data (e.g., JSON documents) from the click stream 130. Such data can be analyzed to discern the developer's intent as to the architecture of the application being created to thereby create and update a model of the application's architecture. Additional information also may be used to generate the model such as resource access policies 180, application descriptions 190, and information from the traffic monitoring service as to the traffic that may pass between resources executing within the provider network. The application architecture modeling service 140 may dynamically update the model as it retrieves and analyzes additional API requests from the API call stream 120 and additional JSON documents from the click stream 130. Thus, as the developer continues to create and modify the application, the application architecture modeling service 140 computes updates to the model. Examples of how the application architecture modeling service generates the model are provided below.

A description of the dynamically updated model, as determined by the application architecture modeling service 140, may be stored in application model storage 145, and the developer console 150 accesses the updated model description from the application model storage to generate a web page, such as a hypertext markup language (HTML) document, that encodes a graphical image of the application model for rendering on a display of the computing device 80. Whenever a web page is to be generated and transmitted to the browser of the computing device 80 by the developer console, an HTML document is generated to render the developer portal while including a graphical image of the updated model. The web page updates may be generated and transmitted to the computing device 80 whenever the developer launches his browser and accesses the developer portal, which may require submitting credentials such as a user name and password and selecting the particular application on which the developer wants to work. Further, each time the developer selects an element on the browser window to cause the developer console 150 to generate a new web page (e.g., a sub-page), the developer console may update the graphical image rendered on the developer's browser by using the model description from application model storage 145 to generate a new HTML document.

In the example of FIG. 1, the developer has created an application 170 comprising resources 171, 172, 173, and 174. The resources are created from the services accessible to the developer in the application development tools 100. The arrows interconnecting the resources 171-174 illustrate the communications that the developer has implemented for the application. That is, the developer has specified that the output from resource 171 is to be provided to resource 172, and output from resource 172 may be provided to resources 173 and 174. The application 170 comprises all of the resources 171-174. The application's architecture identifies which resources are included in the application and how the various resources communicate with one another.

The developer of an application may access numerous services and resources when creating an application. Some of the services and resources the developer accesses may actually be part of the application, while others may not be part of the application. For example, the developer may access a particular database resource in an application that he has created using a database service to edit the format of the database. However, the developer may view custom code he has uploaded to another application only to copy some or all of the code. That code resource is not part of the application currently being created. Moreover, just because a developer accesses a particular resource using the application development tools 100 does not necessarily mean that that particular resource is part of the application being created. In another example, the developer may work on multiple applications during the day. The developer may work on a first application before deciding to work on a second application. The application architecture modeling service 140 determines which resources are likely to be included in the application in light of the fact that the developer may access a resource that is not part of a given application.

In some embodiments, the application architecture modeling service 140 analyzes the click stream data (from click stream 150) and may apply weights to various factors. The analysis may include parsing the JSON documents stored in the click stream to identify the services, resources, and actions indicated in the JSON documents. As noted above, a time stamp may be included within each JSON document. In some embodiments, the application architecture modeling service 140 may determine that a particular resource in the click stream data is part of the application if that particular resource is accessed more than a threshold number of times in a predetermined time period. The threshold number of times and the predetermined time period may be 5 times and 10 minutes, respectively. For example, if from the click stream data, the application architecture modeling service 140 determines that a particular resource was accessed 10 times (which is greater than the threshold of 5) in the last 5 minutes (which is less than the threshold of 10), then the application architecture modeling service 140 determines that that particular resource is part of the application.

In some embodiments, the application architecture modeling service 140 may consider the type of action performed on the resource when determining whether the resource is to be included in the model. For example, editing a given resource may be weighted higher than viewing the resources. Thus, different predetermined weight values may be assigned to different actions and the weighted actions may be associated with their corresponding resources. For example, each time a particular resource is accessed by the developer, a weight value is assigned to that resource by the application architecture modeling service. The weight values for the resource can be added together over a predetermined time period and the resource added to the model based on its weighted sum exceeding a predetermined threshold. As such, a resource is more likely to be determined by the application architecture modeling service 140 to be part of the application the more times that the resource is accessed taking into account the actions performed on the resource. Consequently, a resource that has been edited numerous times in the last 5 minutes is more likely to be included in the model of the application, than a resource that is viewed only two times in that same period of time, depending on how the thresholds and weights are preset.

Some resource types may be considered to be proxies for other resource types. For example, a developer may view a transaction log for one of the resources he has included in the application. The transaction log itself is not part of the application, but is associated with the resource whose transactions it stores. Thus, viewing the transaction log for a given resource can be a proxy for accessing the underlying resource itself. Those resources offered within the provider network that may be proxies for other services and resources may be preconfigured into the executable code comprising the application architecture modeling service 140, or a separate data store that is accessible to the application architecture modeling service 140 may be provided that identifies those resources (e.g., diagnostic logs) and the resources to which they can be considered proxies.

In some embodiments, the application architecture modeling service 140 may use the time stamps which may be included in each entry in the API call and click streams 120, 130 to identify any long gaps in activity from the developer and use a detected lengthy gap as an indication that the developer has switched between applications. For example, if a developer works on a first application and then two hours later begins to work on a second application, the application architecture modeling service 140 can detect that two hour gap in time through examination of the time stamps. The application architecture modeling service 140 may be configured to determine that any resources accessed after a predetermined length of gap in time (e.g., 1.5 hours) are not part of the same application as those resources accessed before the time gap.

In some embodiments, the application architecture modeling service 140 generates a potential model, or potential update, of the architecture of the developer's model, but may compute a confidence score for the potential model or update based on one or more other sources of information. One such additional source of information is from the traffic monitoring service 160. The traffic monitoring service includes or generates multiple logs 162, which may be implemented as non-volatile storage. A log 162 may be generated and assigned to each instantiation of one or more of the resources executing within the provider network 90. For example, for each resource potentially determined to be included in the model from an analysis of the API call and click streams 120, 130, the application architecture modeling service 140 may send a message (e.g., an API request) to the traffic monitoring service 160 to create a log 162 for the corresponding resource.

Each resource (e.g., resources 171-174) may include code that causes a unique data flow token (DFT) to be included in a header of each communication packet that is passed between the resources during execution of the application. In some cases, a developer may execute the application to test it before publishing the application for use by others. The developer may inject test data into the application. In the course of the application's execution, one resource (e.g., resource 171) may send a packet to another resource (e.g., resource 172). If a resource receives a packet that does not contain a DFT, code associated with or part of the resource generates a unique DFT and injects that DFT into the headers of all outgoing packets to other resources. A DFT may be a platform-level data-structure that propagates across service boundaries. In some examples, the DFT is an immutable universally unique identifier that may be included in, for example, a Hypertext Transfer Protocol (HTTP) header. Each resource examines the headers of incoming packets to determine if a DFT is present. If not, the resource generates a DFT and adds one to outgoing packets. If a DFT is present in the header of an incoming packet, the resource propagates the same DFT to downstream packets. As such, packets that are communicated from resource to resource within the application contain the same DFT.

Upon receipt of a packet by an application resource, the resource writes data to an entry in a corresponding log 162. The data may include the DFT as well as an identifier (name, internet protocol (IP) address, etc.) associated with the resource that sent the packet. Through analysis of the data in the logs (which may be performed by the traffic monitoring service or the application architecture modeling service), a determination can be made as to which resources are communicating with other resources. If the analysis of the API call and click streams 120, 130 indicates that resources 171 and 172 are part of the same application, and the traffic monitoring service 160 detects through analysis of the logs 162 that more than a threshold amount of traffic is being passed between resources 171 and 172, then the input from the traffic monitoring service 160 may further confirm that resources 171 and 172 are part of the same application.

In some embodiments, a traffic threshold may be configured into the traffic monitoring service 160. The threshold could be X number of packets per Y unit of time (e.g., 5 packets/minute). As such, the traffic monitoring service 160 analyzes data in the logs 162, and determines whether a resource transmits more than the threshold amount of traffic to another resource. If the threshold is exceeded, the traffic monitoring service 162 may send a message (e.g., an API call) to the application architecture modeling service 140. In some embodiments, the message may be a binary indicator value indicating that resource A has sent packets to resource B. In other embodiments, the message may indicate a value containing the volume of packets (e.g., a packet rate in terms of the number of packets per unit time). The application architecture modeling service 140 may assign (e.g., compute) a confidence score to the traffic value from the traffic monitoring service 160. As described below, the confidence score may be used by the application architecture modeling service 140 to confirm or reject the application's model that the application architecture modeling service 140 otherwise determined based on the data from the API call and click streams 120, 130.

The developer also may configure one or more resource access policies 180 through the developer portal. The resource access policies 180 may be stored in persistent storage. A resource access policy may be created to specify that one particular resource within the application can access another particular resource, or that a particular resource cannot access another particular resource. That two resources are identified in a given resource access policy 180 indicates that those resources are part of the developer's application. A confidence score may be assigned to a resource determined to potentially be part of the application and communicatively coupled to another resource based on the determination that those resources are included in a resource access policy 180. In some embodiments, the confidence score may be assigned as one of two values (e.g., 0 or 1) depending on whether the resource is or is not in a resource access policy.

Some developers may initially generate an alphanumeric description of the resources they intend to include in the application. Various tools may be used to describe the application. The application descriptions 190 thus may be an additional source of information to indicate the architecture of the developer's application. The developer may deviate from the initial description specified in a corresponding application description 190, but the description may be compared to the model determined based on the analysis of the API call and click streams 120, 130 and a confidence score computed based on the comparison.

The more closely the application description 190 matches the model determined based on the analysis of the API call and click streams, the higher will be the computed confidence score, and the larger the difference is between the 130 and a confidence score computed based on the comparison. The more closely the application description 190 matches the model determined based on the analysis of the API call and click streams, the smaller will be the confidence score. The application architecture modeling service 140 may perform the comparison in accordance with variety of techniques. For example, a value of 1 may be assigned for each pair of resources included in both representations (the application description 190 and the model generated from the API call and click streams 120, 130). The "1" values can then be summed to provide an indicator of how closely the two representations match one another, and a confidence score assigned based on the sum of 1's.

Some developers may assign one or more tags 195 to a given resource. A tag (sometimes called a "name" or a "label") may include metadata that indicates something of interest to the developer. For example, the tag may be the name of the team of which the developer is a member, the name of the overall project which is to use the application, etc. That two resources included in the model determined based on the API call and click streams 120, 130 have a common tag indicates that the two resources may be part of the same application. The tags 195 and other information of the various resources may be stored in a database and accessed by the application architecture modeling service 140 and compared to each other as an additional source of confirmation of the model determined based on the streams 120, 130.

In some embodiments, one overall confidence score is computed based on the individual confidence scores from all other sources other than the API call and click streams 120, 130. For example, one overall confidence score is calculated based on the traffic value, the resource access policies 180, the application descriptions 190, and the tags. The overall confidence score may be a weighted average of the individual confidence scores assigned to each source of additional information. If the application architecture modeling service 140 determines that the overall confidence score is greater than a predetermined confidence threshold, then the application architecture modeling service determines that the model determined based on the API call and click streams 120, 130 is valid and stores the model in the application model storage 145; otherwise the model is rejected and not stored in the application model storage 145 and thus not presented to developer via the developer portal. In some embodiments, the model may be stored as an alphanumeric/metadata description of the model containing the names of the various resources, the names of the services of which the resources are derived from, and data that indicates which resources are in communication with one another.

As explained above, the developer console 150 accesses the application model storage 145 to retrieve the data describing the model. The developer console 150 then generates a web page description (e.g., HTML document) that is processed by the developer's browser to render a web page that includes, among other elements, a graphical image of the model of the application. As the data from the application model storage indicates the services of which each resource is derived, the developer console can include hyperlink tags in the web page description for each resource. The hyperlink tags can include URLs or other selectable information for the respective resource's service. Such URL or other selectable information for a given service may be pre-stored in storage within, for example, the application tools 100 or elsewhere in the provider network and accessible to the developer console 150. Upon displaying the web page on computing device 80, each resource visually shown in the model may be hyperlinked. As the developer hovers the cursor over, or otherwise selects, the hyperlink, actions specific to the resource associated with that hyperlink are shown and made available for selection by the developer. In some embodiments, once the developer selects the hyperlink, a message may be returned by the developer's browser containing a URL specified in the hyperlink.

For example, if a resource shown in the graphical image of the model is of a table, table-related actions may be presented to the developer by clicking (or hovering the cursor) on the table in graphically displayed model. Such table-related actions may include an edit function to edit the format of the table, a delete function to remove the table from the model, a link function to link the table to another resource in the application such as another table, etc. Advantageously, the developer need not navigate through browser menu options to select the table-related service and select the particular table resource before finally being able to select the particular action to be performed on the table.

Figure 2:
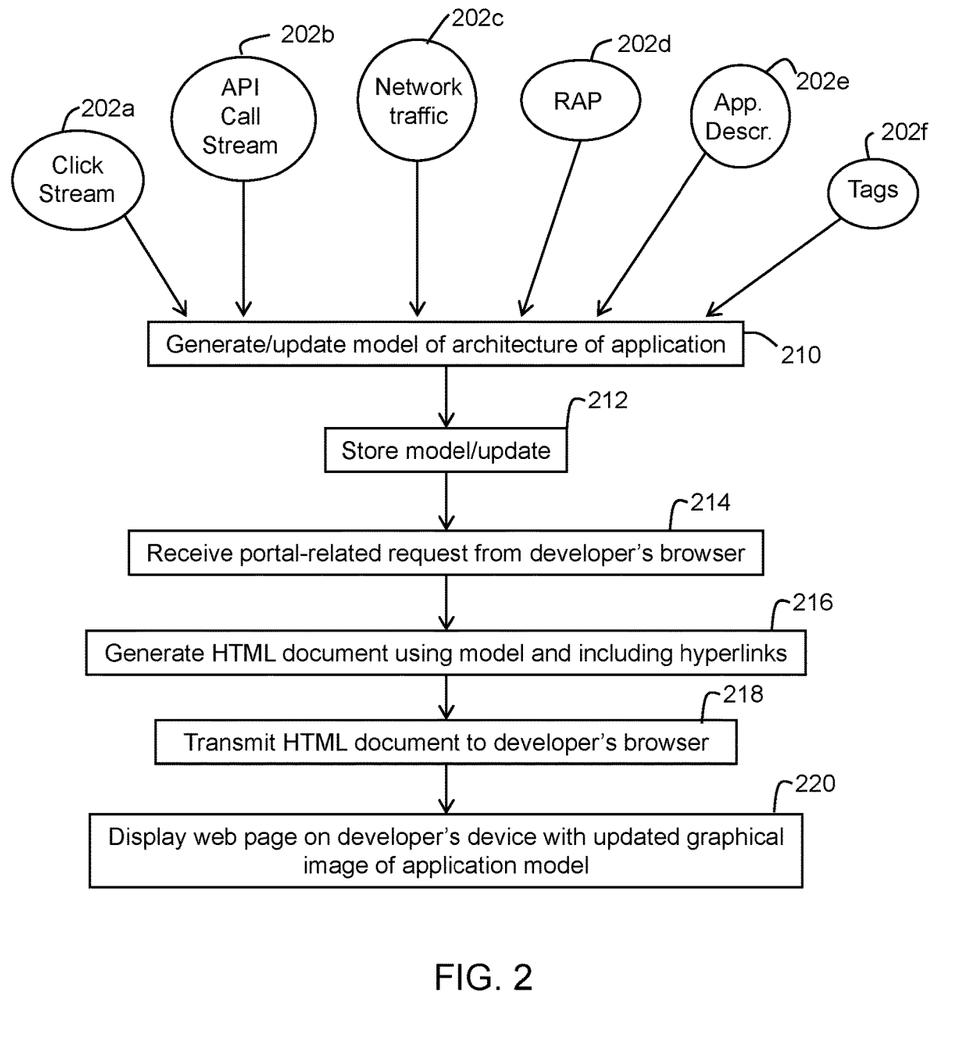
FIG. 2 shows a method for dynamically customizing a developer portal in accordance with various examples.

FIG. 2 shows an example of a related method. The operations may be performed in the order shown, or in a different order. Further, two or more of the operations may be performed concurrently instead of sequentially as depicted.

Operations 202a-e include the collection of various types of information which may be indicative of the architecture of an application being created by a developer. Click stream data may be collected at 202a and such data may be indicative of a portal selection made by the developer on his browser. The data may be in the form of a JSON document generated by the browser as explained above and may include metadata of the service, resource, and action selected. The portal click data may be stored in the click stream 130 pending processing by the application architecture modeling service. At 202b, API calls from the developer may be saved in the API call stream 120 and include much the same information as the click stream data collected at 202a, but in the form of an API request message. Network traffic information is collected at 202c and represents traffic information (e.g., number of messages per unit time) between pairs of resources as explained previously. Further, resource access policy data, application description data and name/tag data may be collected at 202d, 202e, and 202f, respectively. Such data may be stored in databases by separate services executing in the provider network and then retrieved from the databases by the application architecture modeling service 140.

At 210, the method may include generating (or updating if already generated) a model of an architecture of an application to be executed by resources hosted within the provider network. Generating or updating the model may be based on input information such as the data referenced at 202a-f, different data, or additional data as well. In some embodiments, an initial determination of the model is made based on the click stream and API call stream data collected 202a and 202b, and the remaining sources of data collected at, for example, 202c-f may be used to compute a confidence for the model.

Once the model is determined or updated, data descriptive of the model is stored in the application model storage 145. Model description data may be stored in a data structure such as a table that includes identifiers (e.g., names) of the resources determined to comprise the model, mappings between resources determined to communicate with one another, and identifiers of services from which each resource is created.

At 214, the method includes receiving a portal-related request from the developer's browser. The request may be a request for a new web page based on a selection made by the developer on his browser, or the request may be to retrieve the initial developer portal web page to permit the developer to begin to view and continue creating the application. At 216 in response to the portal-related request, the developer console generates an HTML document (or type of web page format) using the model description data from the application model storage 145. The developer console also includes hyperlink tags in the HTML document associated with the various resources so that the developer can readily select one of the visually depicted icons of a particular resource to be managed as described above.

At 218, the HTML document generated at 216 is transmitted to the developer's computing device 80 and displayed at 220 by the browser as a web page on a display of the computing device 80. The displayed web page thus includes the newly created application model (or updated model) on the developer portal rendered by the browser.

Figure 3:
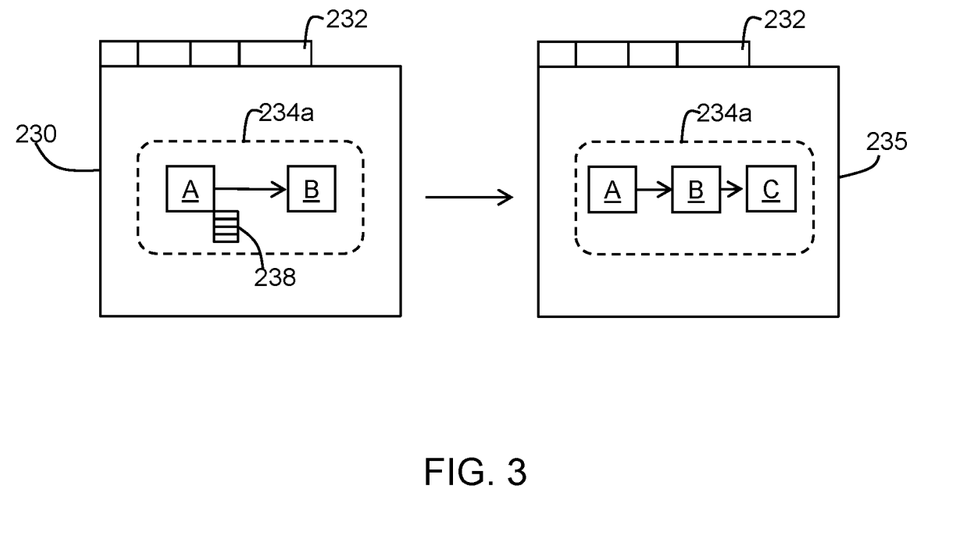
FIG. 3 shows an example of a customized developer portal in accordance with various embodiments.

FIG. 3 shows an example of a developer browser before and after the model is updated. The left-hand image is an illustrative browser window 230 which may include various menu choices 232 across the top. Such menu choices include choices associated with the various services available in the application development tools 100. Reference numeral 234a identifies an area of the window in which a graphical image of the model of the application's architecture is rendered. In this particular example, the model at this point has been determined by the application architecture modeling service to include two resources A and B, and as indicated by the arrow that resource A provides its output to resource B. The resource A and B are hyperlinked as indicated in FIG. 3 by the underlines below A and B. The developer in this example has selected (e.g., by a mouse click) resource A and a set of menu choices 238 are generated by the developer console 150 in response to a message from the application development tools 100.

As the developer further develops the application, an additional resource C may be added by the developer. Once that happens, the application architecture modeling service 140 generates an updated description of the model as explained previously. The right-hand image in FIG. 3 shows another view of a browser window 235 similar to that in browser window 230, but with an updated graphical image of the application's architecture at 234b. The update includes resource C added to application.

Figure 4:
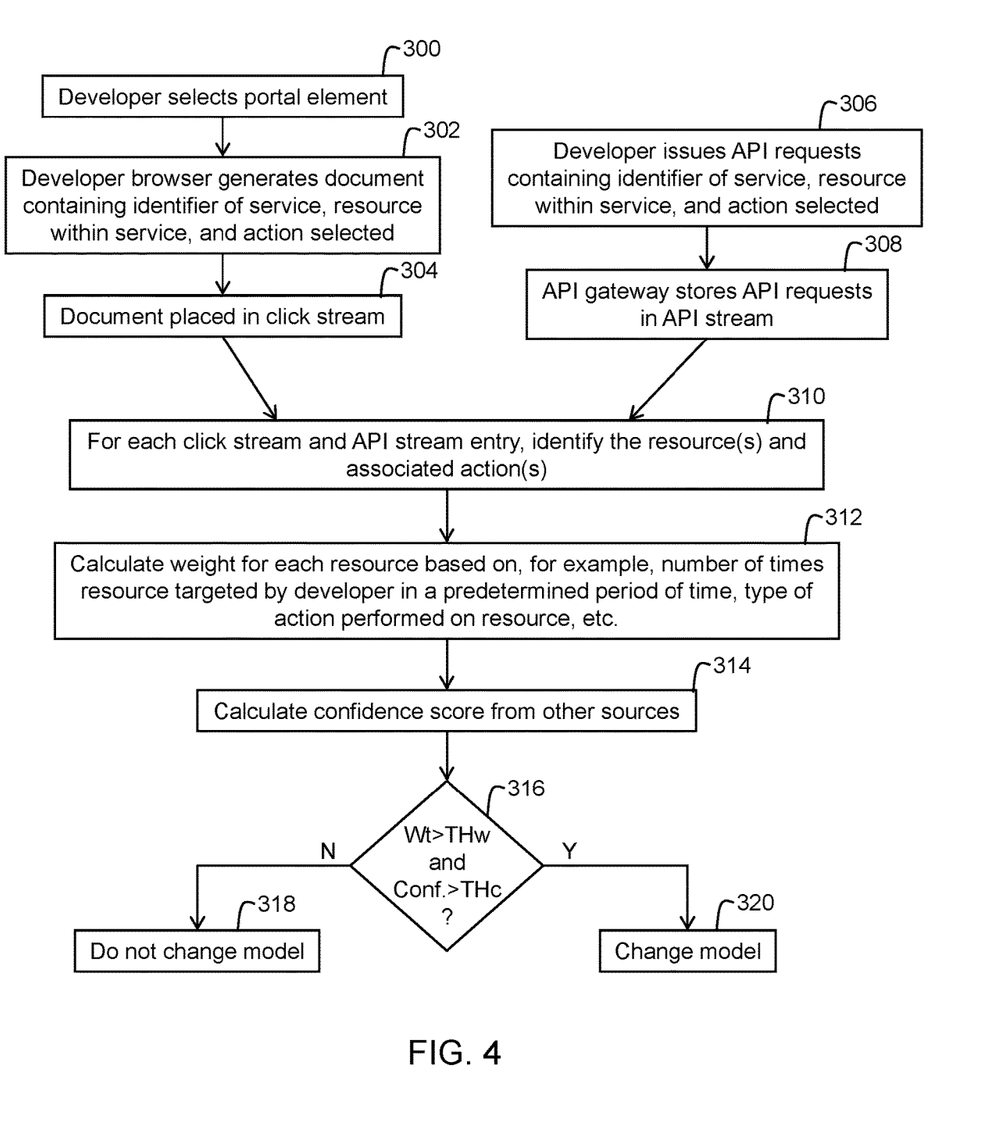
FIG. 4 shows an example of an implementation for determining which resources are determined to be included in a model of an architecture for an application.

FIG. 4 shows another method in accordance with various embodiments. The operations may be performed in the order shown, or in a different order. Further, two or more of the operations may be performed concurrently instead of sequentially as depicted.

At 300, the method includes the developer selecting an element in the developer portal, such as the selection of a resource to be created or edited within a service accessible through the application development tools 100. At 302, the developer's browser generates a document (e.g., an HTML document) containing identifiers of services, resources within the service, and an action selected to be performed on the resource. The document is then placed in the click stream 130 as explained above.

The developer also may interact with the application development tools 100 by way of API requests. At 306, the developer issues API requests which also may include identifiers of services, resources within the service, and an action selected to be performed on the resource. The API requests, or the parameters they contain, may be stored at 308 in the API stream 120.

The application architecture modeling service 140 may perform operations 310-320. At 310, the method includes retrieving click stream data and/or the API call stream data. For each such retrieved click stream or API call stream data, the method includes identifying the resource(s) and associated actions. At 312, the method includes as explained previously calculating a weight for each resource based on, for example, the number of times a resource is targeted by the developer in a predetermined period of time, the type of action performed on the resource, etc. At 314, the method includes calculating a confidence using other sources of information such as network traffic data, resource access policy data, application description data, and tag data 195.

If the weight computed at 312 is above a weight threshold (THw) and the confidence score is above a confidence score threshold (THc), then the model is modified at 320 to include the resource. Otherwise, at 318 no change is made to the model. Changing the model may include modifying the metadata description of the model in the application model storage 145.

Figure 5:
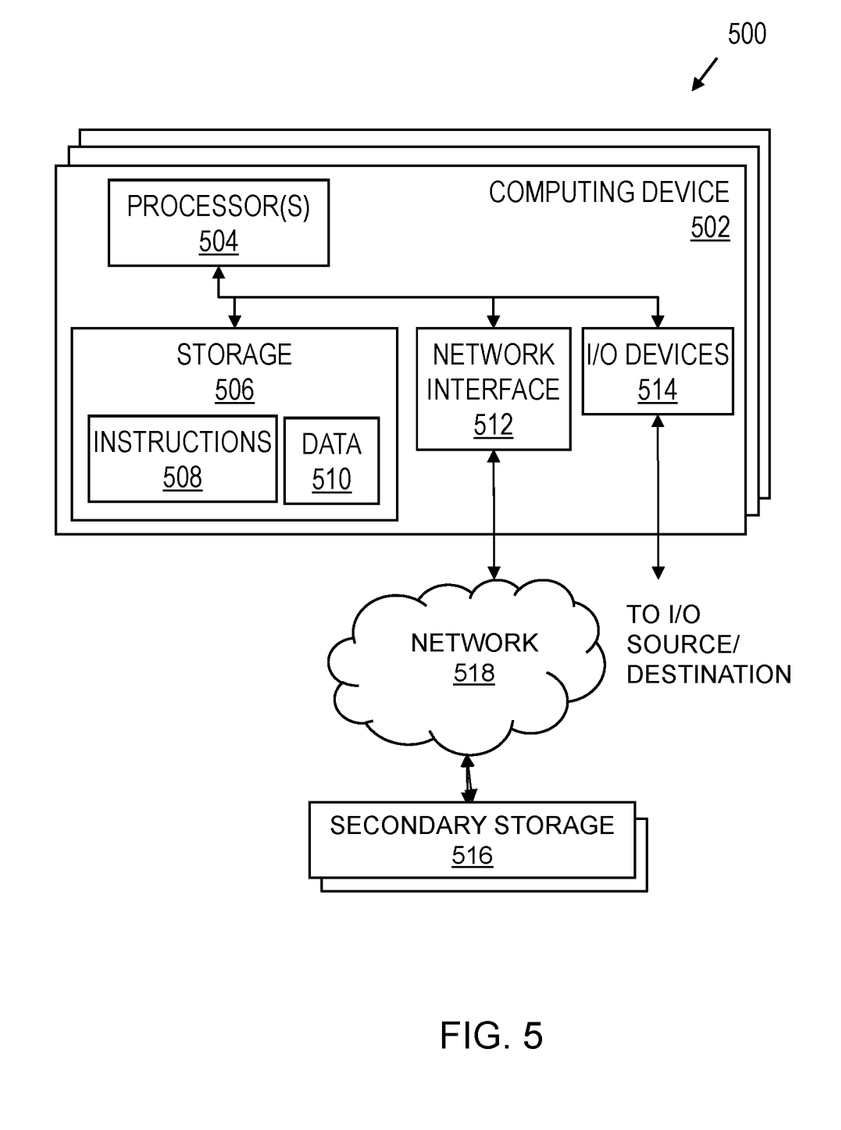
FIG. 5 illustrates a computing node for implementation of the embodiments described herein in accordance with various examples.

FIG. 5 shows a schematic diagram for a computing system 500 suitable for implementation of any of the computers and services described herein such as the application development tools 100, the API sever 110, the API call stream 120, the click stream 130, the application architecture modeling service 140, the application model storage 145, the developer console 150, the traffic monitoring service 160, the storage for the resource access polices, application descriptions and tags, and the resources created by the developer as part of the application. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the various computers and services described herein.

Each computing device 502 includes one or more processors 504 coupled to a storage device 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"); such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the provider network 110, each of the computing devices 502 may implement the same ISA, or individual computing nodes and/or replica groups of nodes may implement different ISAs.

The storage device 506 may include a non-transitory, computer-readable storage device configured to store program instructions 508 and/or data 510 accessible by processor(s) 504. The storage device 506 also may be used to store the machine images as explained above. The storage device 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage device 506, For example, instructions 508 may include instructions that when executed by processors) 504 implement the various services disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the role designation service 162, standby instances 154 and management services 116 and other components described herein may be implemented as a separate computing device 502 executing software to provide the computing node with the functionality described herein. In some embodiments, some or all of the various services, mapping services and other components may be implemented by the same computing device.

The network interface 512 may be configured to allow data to be exchanged bet wen computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   one or more computing devices of a provider network, the one or more computing devices configured to execute an application architecture modeling service and a developer console;
   application programming interface (API) storage for storing an API call stream, API calls in the API call stream usable to create an application hosted on a provider network; and
   click stream storage for storing click stream data indicative of resources selected on a developer portal graphical user interface for creating the application;
   wherein the application architecture modeling service is configured to calculate a weight for each selected resource from at least one of the API call stream and the click stream, to calculate a confidence score for the selected resource, and, responsive to the weight being greater than a weight threshold and the confidence score being greater than a confidence score threshold, to generate or update a model of an architecture of the application, wherein the model includes identifiers of a plurality of resources that form the application; and
   wherein the developer console is configured to generate a web page document that encodes a graphical image of the model, the graphical image including hyperlink tags associated with the resources included in the model, wherein each hyperlink tag contains a reference to operations specific to the associated resource included in the model.

2. The system of claim 1, wherein the application architecture modeling service is configured to computes the confidence score using at least one of:

a value indicating a volume of network traffic between pairs of the resources;

a resource access policy that includes identifiers of resources that are accessible to other resources;

a comparison of description data of a model to the model of the architecture of the application; or a comparison of metadata tags assigned to the resources.

3. The system of claim 1, wherein from the API call stream and the click stream data, the application architecture modeling service is configured to count a number of times a particular resource is included in the API call stream and the click stream data in a period of time, assign a weight to the resource based on the count, and generate or update the model using the weight.

4. The system of claim 1, from the API call stream and the click stream data, the application architecture modeling service is configured to identify a type of action performed on a given resource and assign a weight to the resource based on the action type, and generate or update the model using the weight.

5. The system of claim 1, wherein the application architecture modeling service is configured to repeatedly update the model based on additional API calls added to the API storage or additional click stream data added to the click stream storage.

6. The system of claim 1, wherein the graphical image of the model encoded in the web page document is configured to separately encode a graphical representation of each resource contained in the model.

7. A system, comprising:
one or more computing devices of a provider network configured to:
generate a weighted value of each resource referenced in user interactions with services and resources executing within the provider network;
generate a confidence score for each of the resources referenced in the user interaction;
determine a model of an executable application using resources whose weighted values exceed a first threshold and whose confidence scores exceed a second threshold;
store data defining the model; and
generate a web page description document encoding a customized user interface from the data defining the model.

8. The system of claim 7, wherein each interaction includes at least one of:
data from a click stream storage describing selections of selectable elements on a graphical user interface executing the selections including identifiers of services, resources within each service, and actions to be performed on the resources executing within the provider network; and
application programming interface (API) request parameters from an API call storage data, the API request parameters including identifiers of services, resources within each service, and actions to be performed on the resources executing within the provider network.

9. The system of claim 8, wherein the weighted value of each resource includes a count indicative of a number of times the resource is included in click stream data or the API request parameters in a predetermined period of time.

10. The system of claim 7, wherein the one or more computing devices are configured to compute the confidence score from an additional source of data of the resources.

11. The system of claim 10, wherein the one or more computing devices are configured to compute the confidence score using at least one of:
a value indicating a volume of network traffic between pairs of the resources;
a resource access policy that includes identifiers of resources that are accessible to other resources;
a comparison of description data of a model to the determined model of the executable application; or
a comparison of metadata tags assigned to the resources.

12. The system of claim 7, wherein the one or more computing devices are configured to be associated with a plurality of logs into which traffic data is stored, wherein each log is assigned to an individual resource executing within the provider network, and wherein upon a sending resource sending a packet to a receiving resource, a traffic data record is added to the log of the receiving resource, wherein the traffic data includes an identifier of the sending resource packet and a time stamp.

13. The system of claim 7, wherein the one or more computing devices are configured to determine a time gap in the user interactions that exceeds a threshold and determine that resources referenced in user actions after the time gap are for a different executable application than the resources referenced in user actions before the time gap.

14. A method, comprising:
capturing data indicative of interactions, the interactions being with a plurality of services to create an application executable on a plurality of computing devices;
assigning weights to resources created from the plurality of services;
computing confidence scores for the resources;
modifying a model data descriptive of a model of the application based on the weights exceeding weight thresholds and the confidence scores exceeding confidence score thresholds; and
in response to a request for a web page, generating a web page document encoding a graphical image of the model of the application using the model data and embedding hyperlink tags in the web page document, wherein each hyperlink tag includes a reference to selectable elements of services whose resources are included in the model data.

15. The method of claim 14, wherein assigning the weights includes determining a count value of a number of times a given resource is included in the data indicative of the interactions in a predetermined period of time and assigning a weight to that resource based on the count value.

16. The method of claim 15, wherein assigning the weights also includes determining an action to perform on the given resource and assigning the weight to that resource based on the action as well as the count value.

17. The method of claim 14, wherein:
computing the confidence score comprises computing the confidence score based on at least one of a value indicating a volume of network traffic between pairs of resources, a resource access policy that includes identifiers of resources that are accessible to other resources, a comparison of description data of a model to a model of the architecture of the application, or a comparison of metadata tags assigned to resources.

18. The method of claim 14, further comprising capturing additional data indicative of interactions with the plurality of services, assigning weights to resources included in the additional data, and generating an update to the model data using the weights assigned to the resources included in the additional data.

19. The method of claim 14, wherein capturing the data indicative of the interactions includes storing API calls in an API call stream and storing JavaScript Object Notation (JSON) documents in a click stream, wherein at least some of API calls and JSON documents include identifiers of services, resources of services, an action to be performed on a resource, and a time stamp.

\* \* \* \* \*

UNITED STATES PATENT AND TRADEMARK OFFICE
CERTIFICATE OF CORRECTION

PATENT NO. : 10,725,747 B1
APPLICATION NO. : 15/268820
DATED : July 28, 2020
INVENTOR(S) : Bhushan Sharad Nene It is certified that error appears in the above-identified patent and that said Letters Patent is hereby corrected as shown below:

In the Specification

Column 14,
Line 66, "configured to computes" should be --configured to compute--.

Signed and Sealed this
Fourteenth Day of February, 2023

Katherine Kelly Vidal
*Director of the United States Patent and Trademark Office*